Sept. 29, 1970   J. G. GARRISON   3,530,612
FISHING LURE HAVING NOISEMAKER
Filed Feb. 6, 1969   2 Sheets-Sheet 1

INVENTOR.
James G. Garrison

Sept. 29, 1970     J. G. GARRISON     3,530,612
FISHING LURE HAVING NOISEMAKER
Filed Feb. 6, 1969     2 Sheets-Sheet 2
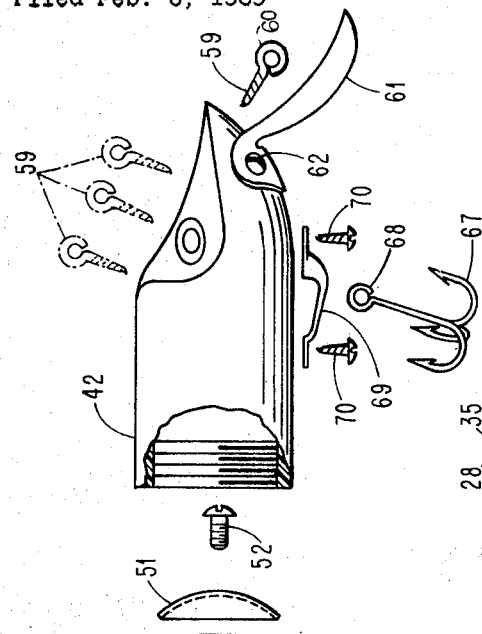
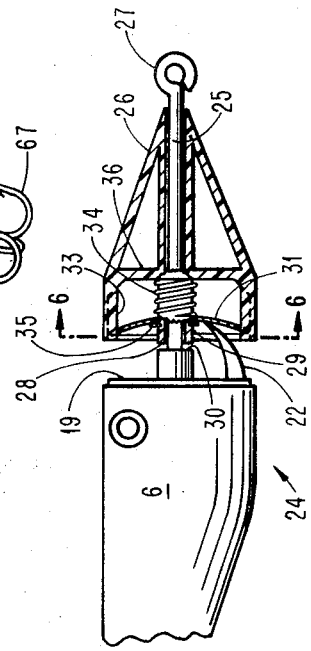
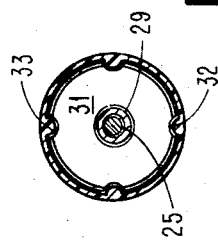
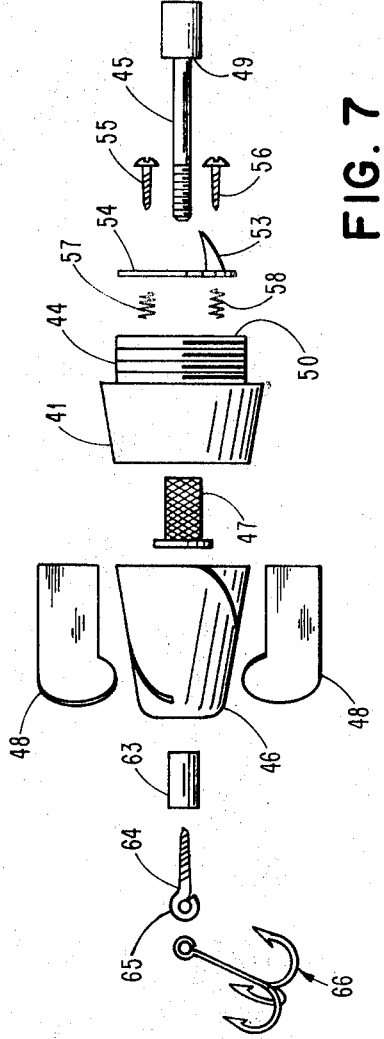

United States Patent Office 3,530,612
Patented Sept. 29, 1970

3,530,612
FISHING LURE HAVING NOISEMAKER
James G. Garrison, Manchester, Ky.
(Rte. 1, Box 125, Monticello, Ky. 42633)
Continuation-in-part of application Ser. No. 685,029, Nov. 22, 1967. This application Feb. 6, 1969, Ser. No. 802,319
Int. Cl. A01k 85/00
U.S. Cl. 43—42.16                                           12 Claims

ABSTRACT OF THE DISCLOSURE

A fishing lure body having a member mounted therewith for rotation when the body is pulled through the water. The member is movable parallel to its axis of rotation for movement into engagement with a tooth of a disc, which is supported on the body, when the body is pulled through the water to produce a noisemaking sound. To prevent breaking of the tooth, either the disc or a portion of the rotating member is resiliently mounted to permit relative movement in the axial direction between the tooth and the rotating member when they are in engagement with each other.

---

This application is a continuation-in-part of application Ser. No. 685,029, filed Nov. 22, 1967, now abandoned.

Fish are attracted to a fishing lure or bait by both the shape of the bait or lure and any noise produced thereby. Thus, if a lure or bait produces a noise that attacts the attention of fish to the bait or lure, the fish are attracted to the noisemaking type of lure or bait since this apparently indicates a life-like object to the fish.

It has been previously suggested in U.S. Pat. 2,270,487 to Withey to form a fish bait that produces a vibration in the water. The Withey patent utilizes a body, which has the contour of a beetle, with a shot rolling therein to produce the vibration. In the Withey patent, an uneven movement of the bait through the water is required to produce any vibration.

The present invention provides a fishing lure in which a buzzing sound is produced without any required uneven movement of the bait or lure as it moves through the water. It is only necessary for the lure of the present invention to be pulled through the water for the noisemaking sound to be produced.

In the present invention, the noise is produced by one member rotating relative to another member and being in engagement therewith. To produce the buzzing sound, it is necessary for one of the members to have a point contact with the other member. Otherwise, sufficient noise is not produced between the two members.

When one of the members has a point contact with the other member, the force exerted by the engagement therebetween can break or bend the element forming the point contact. The present invention satisfactorily solves the foregoing problem by resiliently mounting one of the two engaging members so that there may be relative movement between the two members in a direction parallel to the axis of rotation of the rotating member when the two members are in engagement with each other. This relative movement allows sufficient movement between the element providing the point contact and the other member to prevent any breaking or bending thereof. Thus, the present invention provides a fishing lure that produces a noise and has a relatively long life insofar as the noise-producing element is concerned.

An object of this invention is to provide a noisemaking fishing lure that resiliently mounts one of the engaging surfaces that produces the noise.

Another object of this invention is to provide a noisemaking fishing lure in which the noisemaking elements have a relatively long life.

Other objects of this invention will be readily perceived from the following description, claims, and drawings.

This invention relates to a fishing lure including a body having first means supported thereby for rotation when the body is moved through water. Second means, which is supported by the body, cooperates with the first means to produce a noise when the first means rotates and is in engagement with the second means. One of the first and second means is resiliently mounted by suitable means to allow relative movement between the first and second means in a direction parallel to the axis of rotation of the first means when the first means rotates and the first and second means are in engagement with each other.

The attached drawings illustrate preferred embodiments of the invention, in which:

FIG. 5 is a longitudinal sectional view, partly in elevation, of another form of the lure of the present invention;

FIG. 6 is a cross sectional view, partly in elevation, taken along line 6—6 of FIG. 5;

FIG. 7 is an exploded view of another form of the lure of the present invention; and FIG. 8 is an elevational view, partly in section, of the lure of FIG. 7 in its assembly relation.

Figure 1:
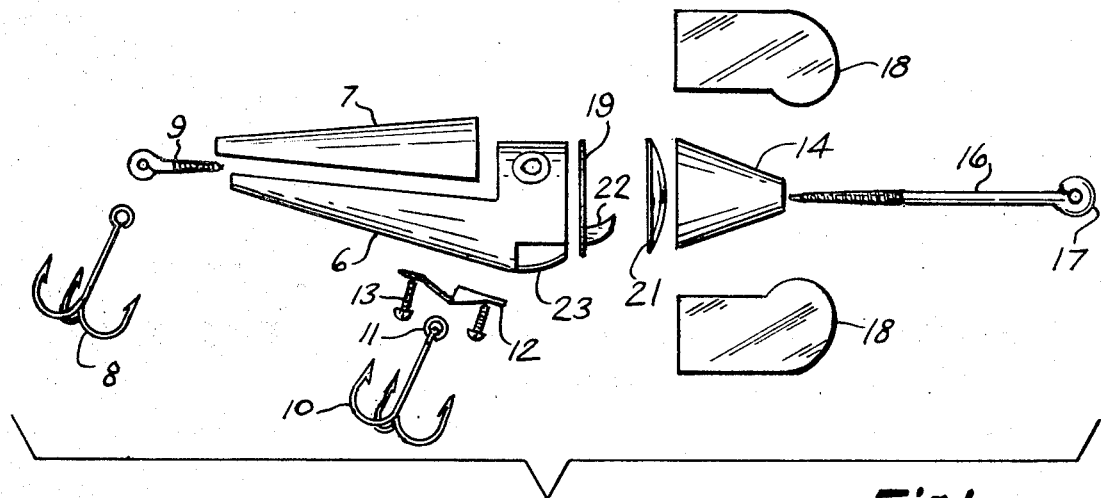
FIG. 1 is an exploded elevational view showing details of one form of the lure of the present invention.
Figure 2:
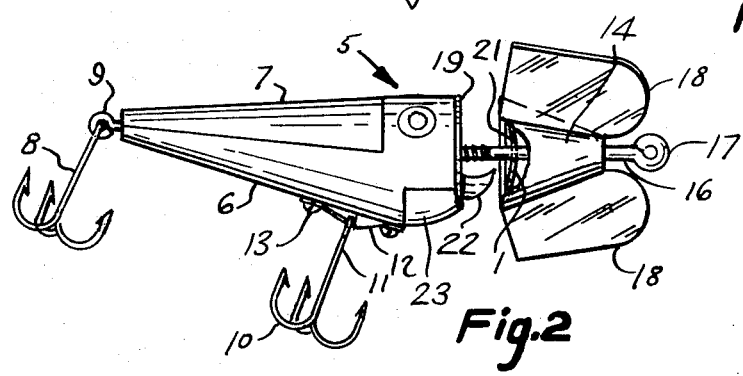
FIG. 2 is a side elevational view of the lure of FIG. 1 in its assembled relation.

Referring to the drawings and particularly FIGS. 1–4, there is shown a lure 5 including a body, which is formed of a main portion 6 and a top portion 7. The main portion 6 and the top portion 7 are secured to each other by any suitable means to form an integral body.

A hook assembly 8, which is preferably a plurality of nickel-plated hooks, is connected to the tail end of the body by a screw 9. The hook assembly 8 is connected to the eye of the screw 9, which is threaded axially into the tail end of the body.

A hook assembly 10, which is similar to the assembly 8, also is supported by the body. The assembly 10 has an eye 11, which is suspended from a hanger 12. The hanger 12 is secured by screws 13 to a lower surface of the main body portion 6.

The lure 5 also includes a conically-shaped nose portion 14, which is formed separate from the body and normally disposed in spaced relation thereto. The nose portion 14 has an axial bore or passage 15 extending therethrough to receive an elongated screw 16, which is threaded into the body portion 6.

The lure 5 is pulled through the water by attaching a line or the like to an eye 17 of the screw 16. When this occurs, propeller blades 18, which are mounted at an angle on the nose portion 14 and fixed thereto by preferably being formed integral therewith, rotate the nose portion 14.

The body portion 6 has a flat disc 19, which is preferably formed of a thin sheet of metal, fixed to the peripheral edge of the body portion 6. With the disc 19 fixed to the peripheral edge of the body portion 6, a space 20, which primarily functions as an amplifier of noises produced by the present invention, is provided between the disc 19 and a recessed portion of the body portion 6.

By forming the main body portion 6 of a suitable plastic material, for example, the material of the main body portion 6 has some resiliency whereby engagement by a concave-convex disc 21, which is preferably formed of a thin sheet of metal, on the nose portion 14 with a tooth 22 on the disc 19 causes some movement of the disc 19 and the tooth 22 in a direction parallel to the axis of rotation of the nose portion 14.

The tooth 22 is formed integral with the disc 19 and has a horn shape. The tooth 22 is preferably a pressed-out portion of the disc 19.

Accordingly, when the lure 5 is pulled through the water, the nose portion 14 rotates and moves axially toward the body portion 6 until the disc 21 engages the tooth 22. Because of the resilient mounting of the disc 19 on the body portion 6, there is some slight movement of the tooth 22 relative to the disc 21 when they are in engagement with each other. This relative movement is along the axis of rotation of the nose portion 14.

When the disc 21 engages the tooth 22, the disc 19 vibrates, and a buzzing sound is produced. This noise attracts the fish to the lure 5 whereby they will be caught on one of the hooks of one of the assemblies 8 and 10.

The lure 5 has a shape, which resembles the body of a fish. Therefore, when the buzzing sound is produced, the fish are attracted to the lure 5.

The axial movement of the nose portion 14 toward the body is limited by engagement of the end face of the disc 21 with the end of the tooth 22 of the disc 19. Likewise, the movement of the nose portion 14 away from the body is limited by engagement with the eye 17 of the screw 16.

The nose portion 14 is preferably formed of the same material as the body. Thus, the nose portion 14 is formed of a suitable plastic when the body is formed of a suitable plastic.

Figures 3, 4:
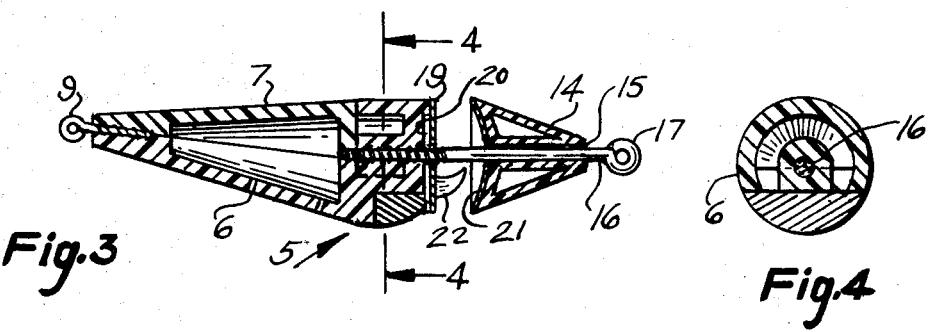
FIG. 3 is a longitudinal sectional view of the lure of FIG. 2 with some parts omitted.
FIG. 4 is a cross sectional view taken along line 4—4 of FIG. 3 and showing the relation of various parts of the lure.

As shown in FIG. 3, the body and the nose portion 14 are formed with hollow areas therein. This permits the lure 5 to be floatable, if desired. However, the lure 5 is shown with a weight 23 on the body portion 6 to cause the lure 5 to not be floatable. Thus, the weight 23 must be omitted for the lure 5 to float when it is pulled through the water.

While the embodiment of FIGS. 1–4 permits resilient movement of the tooth 22 when the nose portion 14 has the disc 21 engaged therewith, the amount of movement in a direction parallel to the axis of rotation of the nose portion 14 is limited. Referring to FIGS. 5 and 6, there is shown a modification of the embodiment of FIGS. 1–4 in which a resilient mounting arrangement is utilized that permits a large relative movement between the engaging members.

As shown in FIG. 5, a lure 24 has a screw 25 extending from the main body portion 6, which is the same as the main body portion 6 of the embodiment of FIGS. 1–4. The screw 25 has a nose portion 26 slidably mounted thereon. The nose portion 26 has blades (not shown) mounted thereon in the same manner as the blades 18 are mounted on the nose portion 14. Thus, the nose portion 26 rotates whenever the lure 24 is pulled through the water by attaching a line or the like to an eye 27 of the screw 25.

The axial motion of the nose portion 26 away from the body portion 6 is limited by engagement of the nose portion 26 with the eye 27. The axial movement of the nose portion 26 toward the main body portion 6 is limited by engagement of an end 28 of a hollow cylindrical part 29 of the nose portion 26 with a shoulder 30, which is formed on the screw 25.

The nose portion 26 has a disc 31, which is preferably a thin sheet of metal, slidably mounted therein. The peripheral edge of the disc 31 is formed with grooves 32 (four shown in FIG. 6) to receive guides 33 (four shown in FIG. 6) on the nose portion 26. The disc 31, which is annular shaped, is slidably supported on the hollow cylindrical part 29 of the nose portion 26.

A spring 34 surrounds the hollow cylindrical part 29 of the nose portion 26 and acts against the disc 31 to urge it towards the tooth 22 of the disc 19, which is supported on the main body portion 6. The movement of the disc 31 by the spring 34 is limited by a stop 35, which is supported by the hollow cylindrical part 29. The spring 34 also engages a support wall 36 of the nose portion 26.

Accordingly, when the lure 24 is pulled through the water, the nose portion 26 is rotated and moves axially to the position of FIG. 5 if the nose portion 26 is not in this position. When this occurs, the disc 31 engages the tooth 22 to produce the buzzing sound. However, because of the spring 34, the disc 31 has sufficient resiliency to produce relative movement between the tooth 22 and the disc 31 in a direction parallel to the axis of rotation of the nose portion 26. This prevents the tooth 22 from being broken or bent due to engagement with the disc 31. This arrangement provides a positive contact between the tooth 22 and the disc 31.

If the nose portion 26 should become entangled with weeds, for example, so as to be prevented from moving when the lure 24 is being pulled through the water, the main body portion 6 and the screw 25 could only move relative to the nose portion 26 for the short distance between the end 28 of the hollow cylindrical part 29 of the nose portion and the shoulder 30 of the screw 25. When the shoulder 30 engages the end 28, there can be no additional relative axial movement between the screw 25 and the nose portion 26. The spring 34 permits this small axial movement without any damage to the tooth 22 by allowing the disc 31 to move against the force of the spring 34. With the shoulder 30 engaging the end 28, the lure 24 can have sufficent force exerted thereon through the line to break the entanglement of the nose portion 26 with the weeds without any damage to the tooth 22.

Since the disc 31 is resiliently mounted, it is not necessary for the main body portion 6 to be formed with the space 20 therein. Thus, the space 20 may be omitted from the body 6 when employing the lure of FIGS. 5 and 6 unless the space 20 is to be used for amplification purposes.

The nose portion 26 is formed of the same material as the body portion. Thus, both the body portion and the nose portion 26 are preferably formed of a suitable plastic. Furthermore, both the body portion and the nose portion 26 have air chambers therein to cause the lure 24 to be floatable. The main body portion 6 may have the weight 23 added thereto if it is desired for the lure 24 to not be floatable.

Referring to FIGS. 7 and 8, there is shown another form of the invention. A lure 40 is formed in the shape of a fish. The lure 40 includes a main body portion 41 and a forward body portion 42, which is hollow in the portion adjacent the main body portion 41. The main body portion 41 has a reduced portion 44 with threads on its outer surface for cooperation with threads on an inner surface of the forward body portion 42 to connect the portions 41 and 42 to each other to form a unitary body.

A shaft 45 is rotatably supported by the main body portion 41 and has a tail portion 46 secured thereto. The tail portion 46 has a hollow member 47 molded therein. The hollow member 47 has threads on its inner surface to cooperate with threads on the shaft 45 to connect the tail portion 46 to the shaft 45.

The tail portion 46 has propeller blades 48 mounted thereon for rotation whenever the lure 40 is moved through the water. Thus, the shaft 45 rotates whenever the lure 40 is pulled through the water.

When the lure 40 is pulled through the water, the tail portion 46 on the shaft 45 can move axially relative to the main body portion 41 only until a shoulder 49 on the shaft 45 engages an end face 50 of the main body portion 41. Thus, the maximum axial movement of the shaft 45 is limited. Under normal operating conditions, the shoulder 49 and the end face 50 of the main body portion 41 are spaced from each other as shown in FIG. 8.

The shaft 45 has a disc 51, which is preferably formed of a thin sheet of metal, mounted on its end by a screw 52. When the shaft 45 is in the position of FIG. 8, the disc 51 engages a tooth 53, which is formed integrally with a disc 54. The tooth 53 is formed by pressing a portion of the disc 54, which is preferably formed of a thin sheet of metal, outwardly and has a horn shape. Accordingly, when the shaft 45 rotates with the disc 51 in engagement with the tooth 53, the engagement of the disc 51 with the tooth 53 produces the buzzing sound.

The disc 54 is slidably mounted on a pair of support pins or screws 55 and 56, which are secured to the main body portion 41. The screws 55 and 56 are preferably at diametrically disposed positions with the tooth 53 disposed 90° from each of the screws 55 and 56.

Springs 57 and 58 are supported on the pins 55 and 56, respectively, and continuously urge the disc 54 toward the disc 51. Each of the pins or screws 55 and 56 has a head thereon to limit movement of the disc 54 by the springs 57 and 58.

The forward body portion 42 has a screw 59 with an eye 60 threaded thereto. The lure 40 is pulled by attaching a line or the like to the eye 60 of the screw 59. It should be understood that the screw 59 may be positioned at other positions, as indicated by phantom lines, to cause different swimming actions of the lure 40.

The forward body portion 42 has a wiggle lip 61. The wiggle lip 61 is attached to the forward body portion 42 by screws 62.

A socket or thimble 63 is secured to the tail portion 46. A screw 64 is mounted in the socket 63. An eye 65 of the screw 64 has an assembly 66 of hooks, which are preferably nickel plated, attached thereto.

A hook assembly 67, which is similar to the hook assembly 66, is supported by the forward body portion 42. The assembly 67 has an eye 68, which is suspended from a hanger 69. The hanger 69 is secured by screws 70 to a lower surface of the forward body portion 42.

The forward body portion 42 of the lure 40 is formed with a pair of eyes 71 (one shown). The eyes 71 are preferably formed by molding raised spots on the forward body portion 42 and painting them.

Accordingly, whenever the lure 40 is pulled through the water, the propeller blades 48 cause rotation of the disc 51. Since the springs 57 and 58 continuously urge the tooth 53 to a position in which it firmly engages against the disc 51 at all times irrespective of whether the disc is rotating, the noise is produced as soon as rotation of the disc 51 begins.

If the tail portion 46 should become entangled with weeds, for example, so as to be prevented from moving when the lure 40 is being pulled through the water, the main body portion 41 could only move relative to the shaft 45 for the short distance between the shoulder 49 on the shaft 45 and the end face 50 of the main body portion 41. When the end face 50 engages the shoulder 49, there can be no additional relative axial movement between the main body portion 41 and the shaft 45. The springs 57 and 58 permit this small axial movement without any damage to the tooth 53 by allowing the disc 54 to move against the force of the springs 57 and 58. With the shoulder 49 and the end face 50 in engagement, the lure 40 can have sufficient force exerted thereon through the line to break the entanglement of the tail portion 46 with the weeds without any damage to the tooth 53.

The main body portion 41, the forward body portion 42, and the tail portion 46 are preferably formed of a suitable plastic material. This enables the lure 40 to float, if desired, by providing suitable air chambers within the plastic material. Of course, a weight may be added to one or both of the body portions 41 and 42 to cause the lure 40 to not float as it is pulled through the water.

It is preferred that the forward body portion 42 have one or more openings (not shown) in its lower surface to allow water to drain from the interior of the body of the lure 40. The water enters the hollow part of the forward body portion 42 by the passage in the lure 40 for the shaft 45. It should be understood that the water enters by seepage when the lure 40 is inert in the water.

If desired, the disc 19 of the embodiment of FIGS. 1–4 could be mounted on the main body portion 6 of the lure 5 in the manner that the disc 54 is mounted on the main body portion 41 of the lure 40. In this arrangement, the space 20 could be omitted unless it were to be used for amplification purposes.

An advantage of this invention is that it prevents bending or breaking of a tooth that forms part of a noise maker for a fishing lure. Another advantage of this invention is that it provides a lure having a noise maker of a relatively long life. A further advantage of this invention is that it is relatively inexpensive.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

I claim:
1. A fishing lure including:
 body means;
 said body means including:
  a first body portion; and
  a second body portion;
 said first body portion having a first engaging member mounted thereon;
 said second body portion having a second engaging member mounted thereon;
 means to slidably mount said first body portion relative to said second body portion so that said first and second engaging members are moved into engagement with each other when said body means is moved through the water;
 said slidably mounting means also rotatably supporting said first body portion for rotation;
 said first body portion having means to cause rotation thereof;
 said first engaging member being mounted on said first body portion for rotation therewith, said first engaging member cooperating with said second engaging member to produce a noise when said first engaging member rotates and is in engagement with said second engaging member;
 and means to resiliently mount one of said first and second engaging members on the cooperating body portion of said body means to allow relative movement between said first and second engaging members in the direction parallel to the axis of rotation of said first engaging member.

2. The lure according to claim 1 in which:
 said first engaging member includes a disc engageable with said second engaging member to produce the noise; and
 said disc is resiliently mounted by said resilient mounting means.

3. The lure according to claim 1 in which one of said first and second engaging members has a projecting element thereon for engagement with the other of said first and second engaging members when said first engaging member is rotating to form a point contact therebetween.

4. The lure according to claim 1 in which said second engaging member includes:
a disc; and
said disc having a projecting element extending therefrom for engagement with said first engaging member when said first engaging member rotates.

5. The lure according to claim 4 in which said disc is resiliently mounted on said second body portion by said resilient mounting means.

6. The lure according to claim 4 in which:
said first engaging member includes a disc engageable with said projecting element on said disc of said second engaging member to produce the noise; and
said disc on said first body portion being resiliently mounted by said resilient mounting means.

7. The lure according to claim 1 in which:
said first engaging member is supported on said first body portion for sliding movement with said first body portion in the direction parallel to the axis of rotation of said first engaging member; and
means limiting the movement of said first engaging member toward said second engaging member in the direction parallel to the axis of rotation of said first engaging member to a less distance than the relative axial movement allowed by said resilient mounting means.

8. The lure according to claim 1 in which:
said second engaging member is resiliently mounted by said resilient mounting means and is continuously urged into engagement with said first engaging member;
said first engaging member being supported on said first body portion for sliding movement with said first body portion; and
means limiting the sliding movement of said first engaging member towards said second engaging member due to sliding movement of said first body portion relative to said second body portion a distance less than the relative axial movement allowed by said resilient mounting means.

9. The lure according to claim 8 in which:
said first engaging member and said second engaging member are disposed within said second body portion and surrounded thereby; and
said first body portion is disposed rearwardly of said second body portion in the direction of movement of said body means through the water.

10. The lure according to claim 3 in which said second engaging member is resiliently mounted on said second body portion by said resilient mounting means.

11. The lure according to claim 1 in which:
each of said first and second engaging members is a disc; and
one of said discs having a projecting element for engaging the other of said discs to form a point contact therebetween, said projecting element being formed as an integral pressed out portion of said one disc.

12. The lure according to claim 5 in which said resilient mounting means urges said disc on said second body portion in a direction toward said first engaging member on said first body portion.

References Cited
UNITED STATES PATENTS 2,079,335    5/1937    Pflueger _____ 43—42.16
2,397,779    4/1946    Edmonds.

SAMUEL KOREN, Primary Examiner

D. J. LEACH, Assistant Examiner

U.S. Cl. X.R.
43—42.06, 42.23, 42.31, 42.39

UNITED STATES PATENT OFFICE
CERTIFICATE OF CORRECTION

Patent No. 3,530,612                              September 29, 1970

James G. Garrison

It is certified that error appears in the above identified patent and that said Letters Patent are hereby corrected as shown below:

Column 2, line 38, after "exploded" insert -- elevational --; line 41, "assembly" should read -- assembled --. Column 3, line 56, "large" should read -- larger --.

Signed and sealed this 6th day of April 1971.

(SEAL)
Attest:

EDWARD M. FLETCHER, JR.                     WILLIAM E. SCHUYLER, JR.
Attesting Officer                             Commissioner of Patents